United States Patent
Isayama et al.

(10) Patent No.: US 9,365,184 B2
(45) Date of Patent: Jun. 14, 2016

(54) VEHICLE STRUCTURE COMPRISING SEATBELT DEVICE

(71) Applicant: HONDA MOTOR CO., LTD., Minato-Ku, Tokyo (JP)

(72) Inventors: Hiroyuki Isayama, Wako (JP); Taku Yamaguchi, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/414,290

(22) PCT Filed: May 24, 2013

(86) PCT No.: PCT/JP2013/064443
§ 371 (c)(1),
(2) Date: Jan. 12, 2015

(87) PCT Pub. No.: WO2014/010318
PCT Pub. Date: Jan. 16, 2014

(65) Prior Publication Data
US 2015/0191149 A1   Jul. 9, 2015

(30) Foreign Application Priority Data

Jul. 13, 2012   (JP) .................. 2012-157234

(51) Int. Cl.
*B60R 22/08* (2006.01)
*B60R 22/195* (2006.01)

(52) U.S. Cl.
CPC ......... *B60R 22/1951* (2013.01); *B60R 22/1954* (2013.01)

(58) Field of Classification Search
USPC .................. 280/802, 803, 804, 806
See application file for complete search history.

(56) References Cited

U.S. PATENT DOCUMENTS

| | | | |
|---|---|---|---|
| 5,149,134 A * | 9/1992 | Fohl | 280/806 |
| 5,344,095 A | 9/1994 | Frei | |
| 5,351,485 A | 10/1994 | Hiruta | |
| 5,403,037 A | 4/1995 | Fohl | |
| 5,458,369 A * | 10/1995 | Matsuki et al. | 280/806 |
| 5,478,115 A * | 12/1995 | Matsuki et al. | 280/806 |
| 5,769,456 A | 6/1998 | Juchem et al. | |

(Continued)

FOREIGN PATENT DOCUMENTS

| | | |
|---|---|---|
| CN | 1080247 A | 1/1994 |
| CN | 1082672 A | 2/1994 |

(Continued)

OTHER PUBLICATIONS

Extended European Search Report issued in the corresponding European Patent Application No. EP13817014.1 dated Jan. 29, 2016.

(Continued)

*Primary Examiner* — Toan To
(74) *Attorney, Agent, or Firm* — Carrier Blackman & Associates, P.C.; Joseph P. Carrier; Anne G. Sabourin

(57) ABSTRACT

Disclosed is a vehicle structure comprising a seatbelt device, in which diffusion of a hot gas produced in a pretensioner is easily minimized by a simple configuration. In the vehicle structure comprising a seatbelt device, the pretensioner is provided on a rear inner side panel, and an interior material covering the pretensioner is provided on the side facing the vehicle interior. The interior material has a dividing wall provided on the rear surface, the dividing wall protruding toward the rear inner side panel. The dividing wall encloses the pretensioner and partitions the gap between the rear inner side panel and the interior material.

7 Claims, 5 Drawing Sheets

(56) References Cited

U.S. PATENT DOCUMENTS

| | | | |
|---|---|---|---|
| 6,877,776 B2 | 4/2005 | Ukita et al. | |
| 7,618,064 B2 * | 11/2009 | Kuroki | 280/806 |
| 2009/0108577 A1 | 4/2009 | Hirotani | |
| 2010/0123301 A1 * | 5/2010 | Thomas | 280/733 |
| 2011/0316265 A1 * | 12/2011 | Lane, Jr. | 280/806 |

FOREIGN PATENT DOCUMENTS

| | | |
|---|---|---|
| EP | 0639485 A1 | 2/1995 |
| JP | S55-27583 U | 2/1922 |
| JP | S55-63243 U | 4/1980 |
| JP | S55-147946 U | 10/1980 |
| JP | 07-002140 A | 1/1995 |
| JP | 2003-146184 A | 5/2003 |
| JP | 2010-120489 A | 6/2010 |

OTHER PUBLICATIONS

Office Action issued in the corresponding Chinese Patent Applicaion 201380037339.2 dated Jan. 26, 2016 with the English machine translated thereof.

* cited by examiner

VEHICLE STRUCTURE COMPRISING SEATBELT DEVICE

TECHNICAL FIELD

The present invention relates to a vehicle structure equipped with a seatbelt device mounted on a panel of a vehicle body and having a pretensioner for retracting a webbing to restrain a passenger.

BACKGROUND ART

Seatbelt devices for vehicles are known which include a pretensioner for retracting a webbing to properly restrain a passenger upon collision or emergency braking. According to the seatbelt devices, when a collision or an emergency braking is detected by an acceleration sensor, a gas generator is ignited to generate gas based on a detection signal, and the webbing is retracted by a pressure of the generated gas. By retracting the webbing in this manner, the passenger can be properly restrained.

In the seatbelt devices including the pretensioner, however, since the gas generator is ignited to generate gas for retracting the webbing by the pressure of the generated gas, the pressure of the gas becomes high. Therefore, the hot gas is likely to leak outside a case of the pretensioner, and further, the leaked hot gas is likely to diffuse.

As a countermeasure thereto, a pretensioner is disclosed, for example, in Patent Document 1, which includes a heat absorbing member formed of high thermal conductivity material and provided in a gas supply space where gas is supplied. With this configuration, thermal energy of the hot gas is absorbed by the heat absorbing member, and the temperature of the gas is thereby lowered, so that an influence of the leaked hot gas can be minimized.

However, in the pretensioner of Patent Document 1, since it is necessary to provide the heat absorbing member in the gas supply space, a space for the heat absorbing member must be secured in the gas supply space of the pretensioner. Further, the provision of the heat absorbing member in the pretensioner undesirably increases the number of necessary components and complicates the configuration of the pretensioner. Thus, it is difficult to minimize the diffusion of the hot gas generated in the pretensioner with ease and simple configuration.

PRIOR ART LITERATURE

Patent Literature

Patent Document 1: Japanese Patent Application Laid-Open Publication (JP-A) No. 2003-146184

SUMMARY OF INVENTION

Technical Problems

It is therefore an object of the present invention to provide a vehicle structure equipped with a seatbelt device which is capable of easily minimizing diffusion of hot gas generated in a pretensioner by a simple configuration.

Solutions to Problems

According to a first aspect of the present invention, there is provided a vehicle structure equipped with a seatbelt device, wherein a pretensioner for retracting a webbing to restrain a passenger is provided on a panel of a vehicle body, and an interior material covering the pretensioner is provided on a side facing a vehicle interior, characterized in that one of the interior material and the panel has a dividing wall formed thereon to enclose the pretensioner and partition a gap between the panel and the interior material.

Preferably, the interior material and the dividing wall are formed of resin, and the dividing wall is formed on the interior material.

Preferably, the dividing wall is formed to be opened upward.

Preferably, soundproof members are provided on a peripheral part of the dividing wall on a side opposite to the pretensioner with respect to the dividing wall.

Advantageous Effects of Invention

In the invention, the pretensioner is covered by the interior material, and the dividing wall that partitions the gap between the panel and the interior material is formed to enclose the pretensioner. With this configuration, when hot gas generated in the pretensioner leaks out, the leaked hot gas can be prevented from diffusing in the gap between the panel and the interior material. Thus, by only providing the dividing wall on the interior material, it is possible to easily minimize the diffusion of the hot gas generated in the pretensioner with such a simple configuration.

In the invention, the interior material and the dividing wall are formed of resin, and the dividing wall is formed on the interior material. That is, the dividing wall can be integrally formed together with the interior material when the resin interior material is formed (molded). As a result, the dividing wall can be formed with further simple configuration, while enhancing a degree of freedom in the shape of the dividing wall.

In the invention, by forming the dividing wall to be opened upward, the webbing drawn from the seatbelt device can be prevented from interfering with the dividing wall.

In the invention, with the dividing wall formed on the interior material, hot gas generated in the pretensioner is prevented from diffusing beyond the dividing wall to the peripheral part on the side opposite to the pretensioner (i.e., peripheral part of the dividing wall). The soundproof members provided on the peripheral part of the dividing wall is therefore ree from an influence of the hot gas of the pretensioner.

Accordingly, the soundproof members can be installed on the peripheral part of the dividing wall on the side opposite to the pretensioner with respect to the dividing wall, thereby increasing the area for installing the soundproof members. As a result, the soundproof members can be arranged at more appropriate positions, thereby enhancing a degree of freedom in design and improving a soundproof effect.

DESCRIPTION OF EMBODIMENTS

A certain preferred embodiment of the present invention will be described in detail below with reference to the accompanying drawings.

Embodiment

Figure 1:
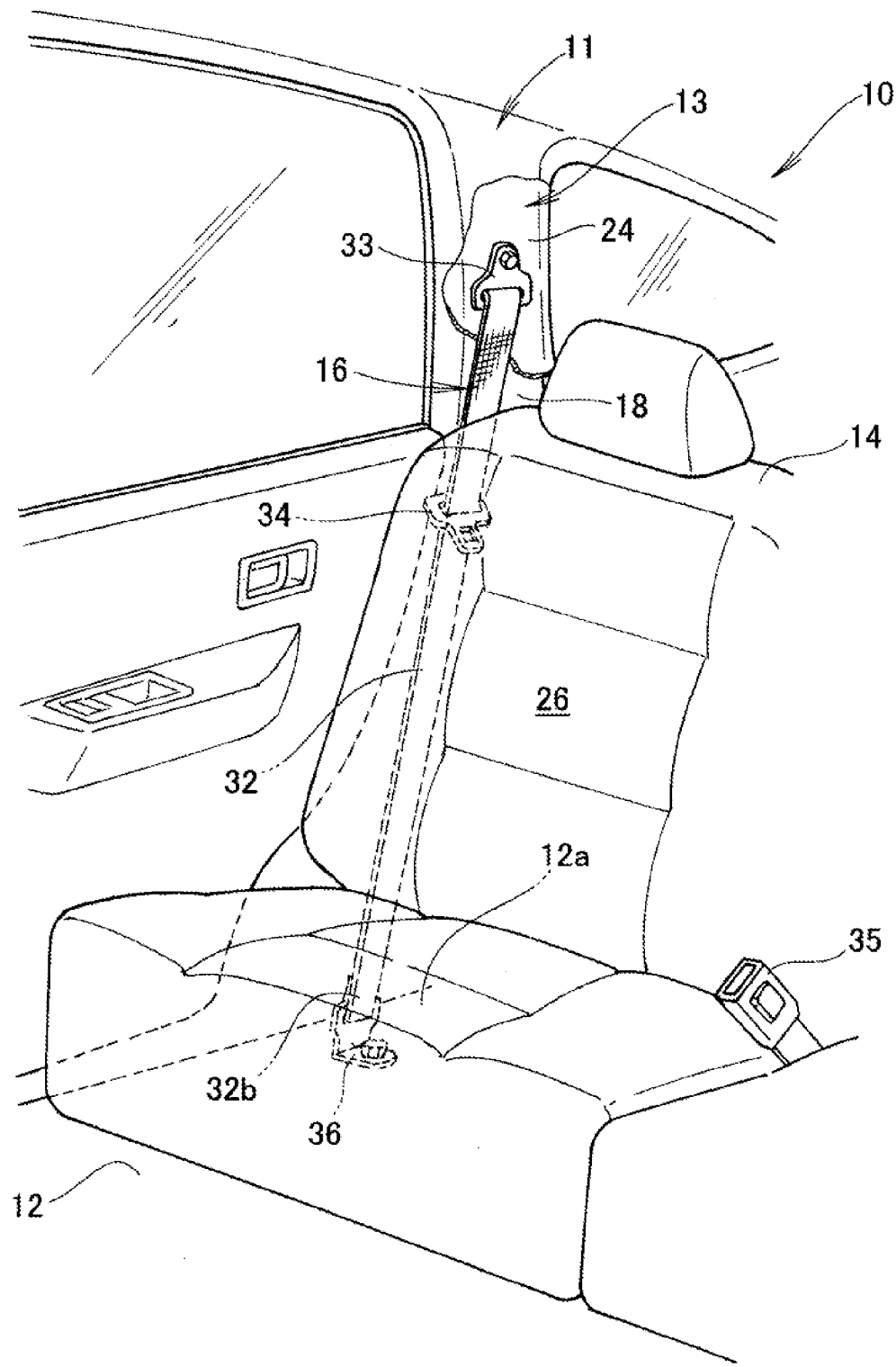
FIG. 1 is a perspective view of a vehicle structure equipped with a seatbelt device according to the present invention, as viewed from a vehicle interior side.

As shown in FIG. 1, a vehicle structure 10 equipped with a seatbelt device includes a rear floor panel 12 constituting a floor of a vehicle body 11, a rear fender 13 extending upward from a right side part 12a of the rear floor panel 12, and a rear seat 14 disposed on the rear floor panel 12.

The vehicle structure 10 further includes a seatbelt device 16 mounted on the rear floor panel 12 and the rear fender 13, an interior material 18 covering a retractor/pretensioner unit 31 (FIG. 2) of the seatbelt device 16, and a soundproof unit 21 (FIG. 2) provided on the interior material 18.

Figure 2:
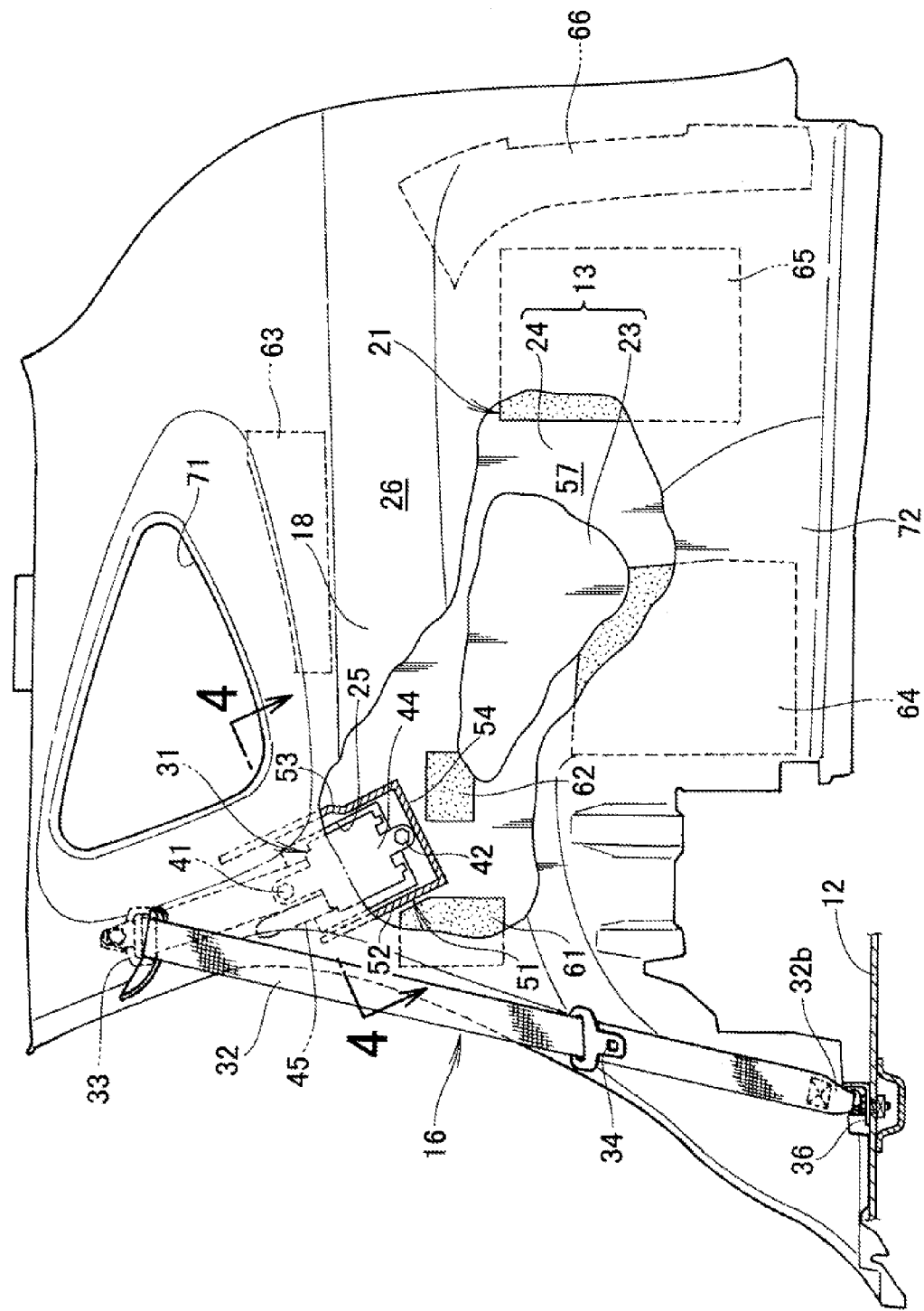
FIG. 2 is a side view of the vehicle structure of FIG. 1 as viewed from the vehicle interior side.

As shown in FIG. 2, the rear fender 13 includes a rear outer side panel 23 facing outside the vehicle body 11, and a rear inner side panel (panel) 24 located inside the rear outer side panel 23 and facing a vehicle interior 26. The rear inner side panel 24 has an opening 25 (see also FIG. 3) formed therein for mounting the retractor/pretensioner unit 31. The seatbelt device 16 is a three-point seatbelt device configured to restrain a passenger sitting on the rear seat 14 (FIG. 1).

Figure 3:
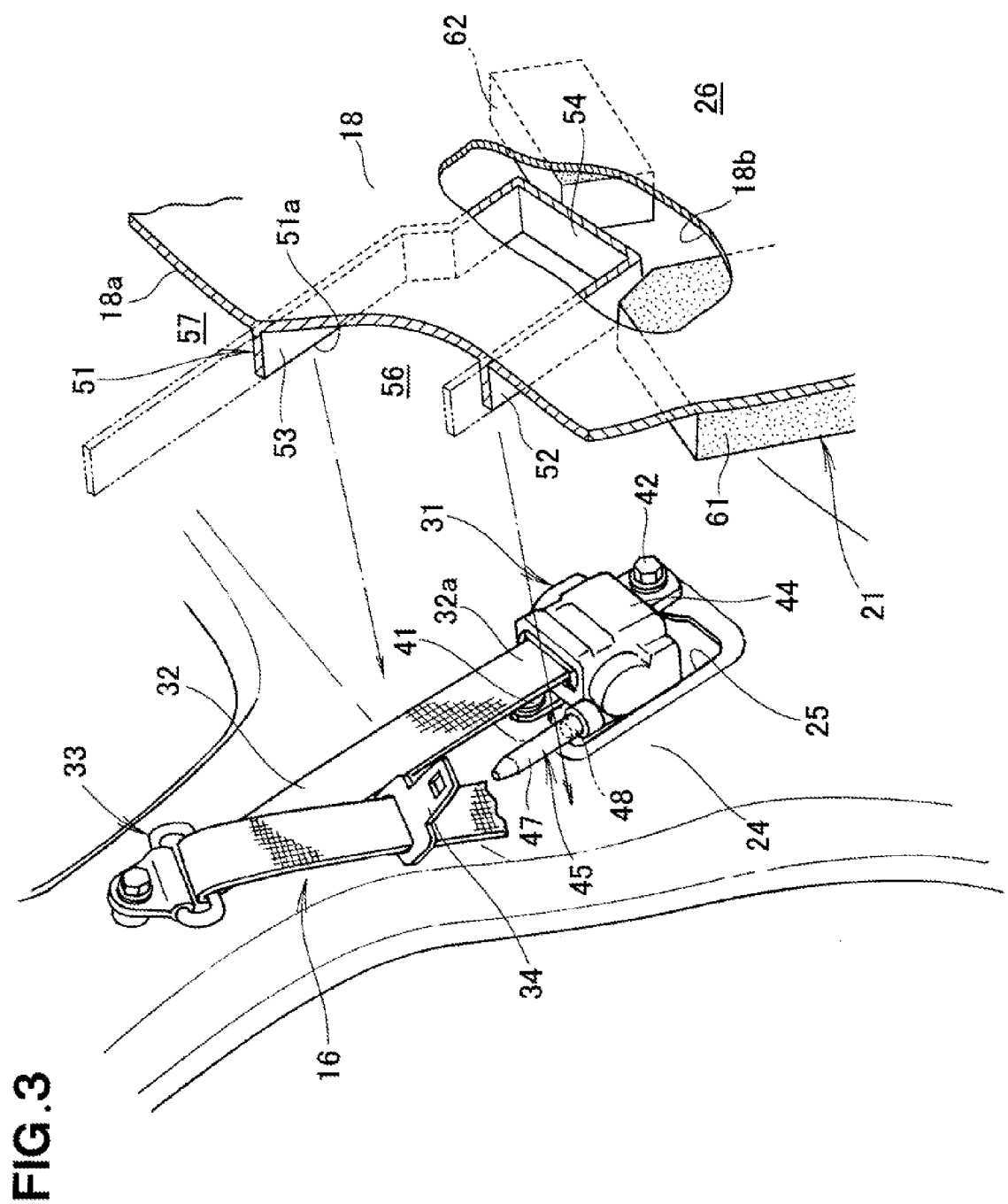
FIG. 3 is an exploded perspective view of the vehicle structure of FIG. 2.

As shown in FIGS. 2 and 3, the seatbelt device 16 includes the retractor/pretensioner unit 31 mounted on the rear fender 13, a webbing 32 having an upper end 32a connected to the retractor/pretensioner unit 31, and an upper slip guide 33 that slidably supports the webbing 32.

The seatbelt device 16 further includes a tongue 34 slidably provided on the webbing 32, a buckle 35 (FIG. 1) for engagement with the tongue 34, and an attachment portion 36 for attaching a lower end 32b of the webbing 32 to the rear floor panel 12.

The retractor/pretensioner unit 31 is housed in the opening 25 of the rear inner side panel 24 and fixed to the rear inner side panel 24 via upper and lower bolts 41, 42. Namely, a pretensioner 45 is provided on the rear inner side panel 24. The retractor/pretensioner unit 31 includes a retractor 44 configured to wind the webbing 32, and the pretensioner 45 configured to pull the webbing 32.

The pretensioner 45 is provided at a top part 44a (FIG. 4) of the retractor 44. The pretensioner 45 includes a gas generator 46 (FIG. 4) for generating gas when ignited, and a piston 48 movable within a cylinder 47 by pressure of the generated gas. A winding shaft is linked to the piston 48 via a cable, and the upper end 32a of the webbing 32 is connected to the winding shaft.

As shown in FIGS. 1 and 3, according to the seatbelt device 16, by bringing the tongue 34 into engagement with the buckle 35 and making winding force of the retractor 44 act on the webbing 32, a passenger sitting on the rear seat 14 can be restrained by the webbing 32.

Further, according to the seatbelt device 16, when a collision or an emergency braking is detected by an acceleration sensor, the gas generator 46 of the pretensioner 45 is ignited to generate gas based on a detection signal. The piston 48 is moved by a pressure of the generated gas, and the webbing 32 linked with the piston 48 via the winding shaft is pulled or retracted. By retracting the webbing 32 in this manner, the passenger can be properly restrained by the webbing 32.

Figure 4:
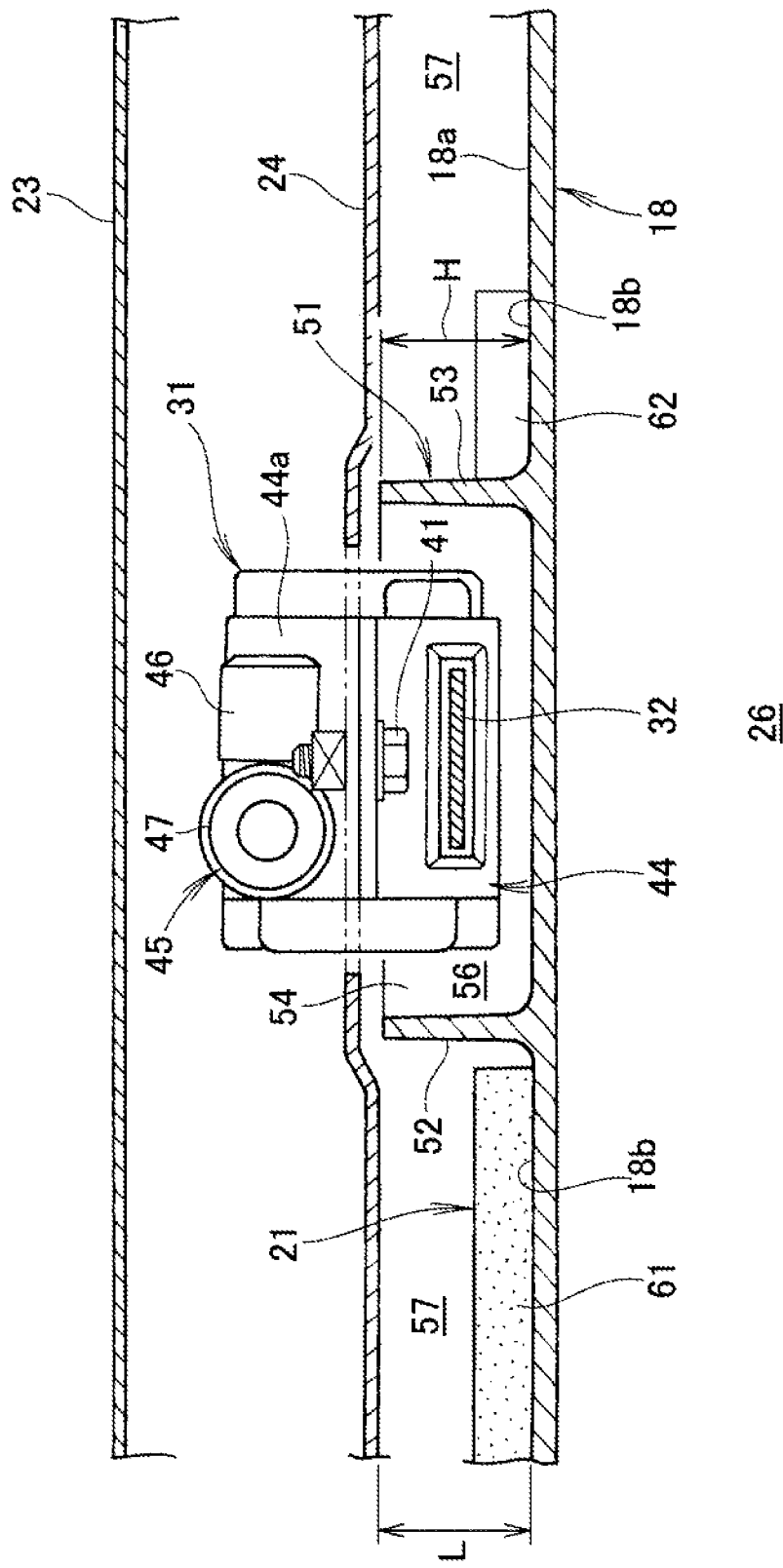
FIG. 4 is a cross-sectional view taken along line 4-4 of FIG. 2.

As shown in FIGS. 3 and 4, the interior material 18 is a resin lining material provided on the rear inner side panel 24 on a side facing the vehicle interior 26 with a gap L therebetween to thereby constitute a wall surface of the vehicle interior 26. By thus providing the interior material 18 on the rear inner side panel 24 on the side facing the vehicle interior 26 with the gap L therebetween, the retractor/pretensioner unit 31 is covered by the interior material 18. In other words, the pretensioner 45 is covered by the interior material 18 so as not to be seen from the vehicle interior side.

The interior material 18 is formed of resin and having a dividing wall 51 integrally formed on a rear surface or back surface 18a thereof. The back surface 18a of the interior material 18 is a surface facing the retractor/pretensioner unit 31, i.e. the pretensioner 45. The interior material 18 further has, on the back surface 18a, a peripheral part 18b of the dividing wall 51 constituting a part on a side opposite to the retractor/pretensioner unit 31 (pretensioner 45) with respect to the dividing wall 51.

The dividing wall 51 is formed of resin. Since the interior material 18 and the dividing wall 51 are both formed of resin, the dividing wall 51 can be integrally formed together with the interior material 18 when the resin interior material 18 is formed (molded). As a result, the dividing wall 51 can have a simple configuration, and can be easily formed. Further, by forming (molding) the dividing wall 51 integrally together with the interior material 18, a degree of freedom in the shape of the dividing wall 51 can be enhanced.

The dividing wall 51 includes a front wall part 52, a rear wall part 53, and a bottom wall part 54, and is formed substantially in a U shape (box-like shape) opened upward by the front wall part 52, the rear wall part 53, and the bottom wall part 54. By forming the dividing wall 51 to be opened upward, the webbing 32 drawn from the retractor 44 can be prevented from interfering with the dividing wall 51.

Further, by forming the dividing wall 51 substantially in the U shape, a front part, a rear part, and a bottom part of the retractor/pretensioner unit 31 are enclosed by the dividing wall 51. The dividing wall 51 has a projecting height. H which is set so that a projecting end 51a of the dividing wall 51 is located adjacent to the rear inner side panel 24. With this configuration, the gap L between the rear inner side panel 24 and the interior material 18 is divided by the dividing wall 51 into a housing space 56 and an outside space 57.

The housing space 56 is a space within which the retractor/pretensioner unit 31 is housed. The outside space 57 is a space outside the housing space 56, and the retractor/pretensioner unit 31 is not housed in this space. That is, the front part, the rear part, and the bottom part of the retractor/pretensioner unit 31 are separated from the outside space 57 by the dividing wall 51.

In this manner, the dividing wall 51 is formed to enclose the retractor/pretensioner unit 31, and to divide the gap L between the rear inner side panel 24 and the interior material 18 into the housing space 56 and the outside space 57.

Since the retractor/pretensioner unit 31 is enclosed by the dividing wall 51, the pre tensioner 45 of the retractor/pretensioner unit 31 is enclosed by the dividing wall 51. More specifically, the gas generator 46 of the pretensioner 45 is arranged at the top part 44a of the retractor 44. Further, the front wall part 52 of the dividing wall 51 is arranged forward of the gas generator 46 in a longitudinal direction of the vehicle body, and the rear wall part 53 of the dividing wall 51 is arranged rearward of the gas generator 46.

With this arrangement, when hot gas generated in the pretensioner 45 leaks out, the leaked hot gas can be prevented from diffusing in the gap L between the rear inner side panel 24 and the interior material 18. Thus, by only providing the dividing wall 51 on the interior material 18, it is possible to easily minimize the diffusion of the hot gas generated in the pretensioner 45 with such a simple configuration.

As shown in FIGS. 2 and 4, in the outside space 57 between the rear inner side panel 24 and the interior material 18, the soundproof unit 21 is installed on the back surface 18a of the interior material 18. The soundproof unit 21 includes first to sixth soundproof members 61 to 66. The first to sixth soundproof members 61 to 66 are arranged, on the back surface 18a of the interior material 18, at desirable positions in the outside space 57.

The first soundproof member 61 and the third to sixth soundproof members 63 to 66 are formed of sound absorbing material made of nonwoven fabric that is obtained by integrating fibers such as polyethylene telephthalate. The second soundproof member 62 is formed of sound absorbing material made of foam material such as polyethylene foam. By installing the soundproof unit 21 on the back surface 18a of the interior material 18, in the outside space 57, noise in the vehicle interior can be suppressed.

As shown in FIGS. 3 and 4, the first soundproof member 61 and the second soundproof member 62 are arranged, on the back surface 18a of the interior material 18, on the peripheral part 181) of the dividing wall 51. The peripheral part 18b of the dividing wall 51 is a part of the back surface 18a of the interior material 18, the part being located on the side opposite to the retractor/pretensioner unit 31 with respect to the dividing wall 51 (i.e., on the side of the outside space 57) and constituting a periphery of the dividing wall 51. That is, the first soundproof member 61 and the second soundproof member 62 are separated from the retractor/pretensioner unit 31 by the dividing wall 51.

As shown in FIG. 2, the third soundproof member 63 is arranged in a region located rearward of the dividing wall 51 and below a quarter window frame 71. The fourth soundproof member 64 is arranged in a region located below the dividing wall 51 and corresponding to a wheel house 72. The fifth soundproof member 65 is arranged rearward of the fourth soundproof member 64. Further, the sixth soundproof member 66 is arranged rearward of the fifth soundproof member 65. The third to sixth soundproof members 63 to 66 are thus arranged at positions relatively remote from the peripheral part 18b of the dividing wall 51.

As shown in FIGS. 3 and 4, the dividing wall 51 is formed on the back surface 18a of the interior material 18. With the dividing wall 51, when hot gas generated in the pretensioner 45 leaks out, the leaked hot gas can be prevented from diffusing beyond the dividing wall 51 to the peripheral part 18b on the side opposite to the pretensioner 45 (i.e., peripheral part 18b of the dividing wall 51).

Since the diffusion of the leaked hot gas is thus minimized, the first soundproof member 61 and the second soundproof member 62 are free from an influence of the hot gas of the pretensioner 45. Therefore, the first soundproof member 61 and the second soundproof member 62 can be installed on the peripheral part 18b of the dividing wall 51, thereby increasing the area for installing the first soundproof member 61 and the second soundproof member 62.

Further, since the diffusion of the leaked hot gas is minimized, the third to sixth soundproof members 63 to 66 located relatively remote from the peripheral part 18b of the dividing wall 51 are also free from the influence of the hot gas of the pretensioner 45. Therefore, the third to sixth soundproof members 63 to 66 can be installed without considering the influence of the hot gas, thereby increasing the area for installing the third to sixth soundproof members 63 to 66.

Next will be described, with reference to FIGS. 5A-5B, how gas generated in the pretensioner 45 of the seatbelt device 16 is prevented from diffusing.

Figure 5A:
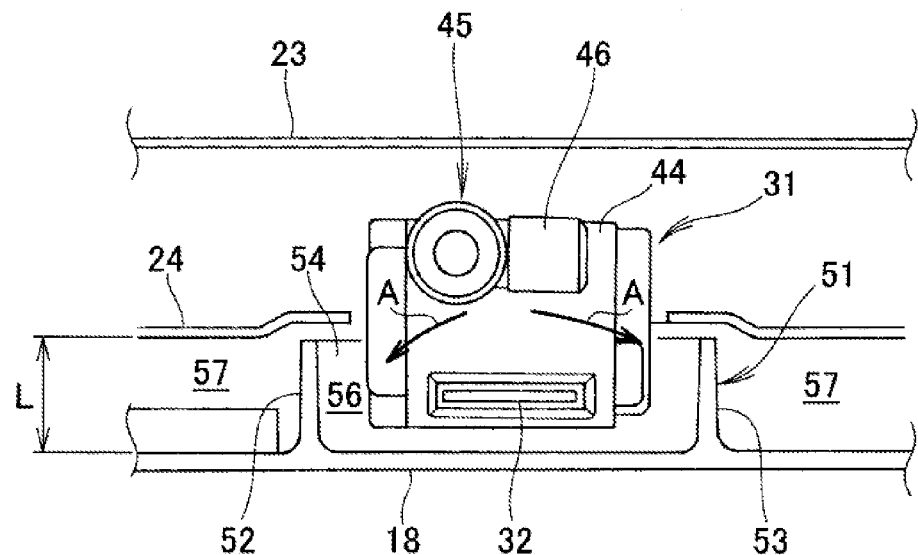
FIG. 5A is a view showing how hot gas leaked from a pretensioner is prevented from diffusing by a dividing wall.

As shown in FIG. 5A, when a collision or an emergency braking is detected by the acceleration sensor, the gas generator 46 of the pretensioner 45 is ignited to generate gas based on a detection signal. The piston 48 (FIG. 3) is moved by a pressure of the generated gas, and the webbing 32 linked with the piston 48 via the winding shaft is retracted. By retracting the webbing 32 in this manner, the passenger can be properly restrained by the webbing 32.

Since the gas generator 46 is ignited to generate gas for causing the piston 48 (FIG. 3) to move by the pressure of the generated gas, the pressure of the gas becomes high, so that the hot gas is likely to leak outside the pretensioner 45 from the gas generator 46 (i.e., pretensioner 45) as indicated by arrows A.

In the embodiment, the dividing wall 51 is therefore provided on the interior material 18 covering the pretensioner 45 so as to enclose the pretensioner 45. Further, the gap L between the rear inner side panel 24 and the interior material 18 is partitioned by the dividing wall 51.

With the dividing wall 51, the gap L between the rear inner side panel 24 and the interior material 18 is divided into the housing space 56 and the outside space 57. Thus, when the hot gas leaks out from the pretensioner 45 to the housing space 56, the leaked hot gas can be prevented from diffusing from the housing space 56 to the outside space 57 by the dividing wall 51.

Figure 5B:
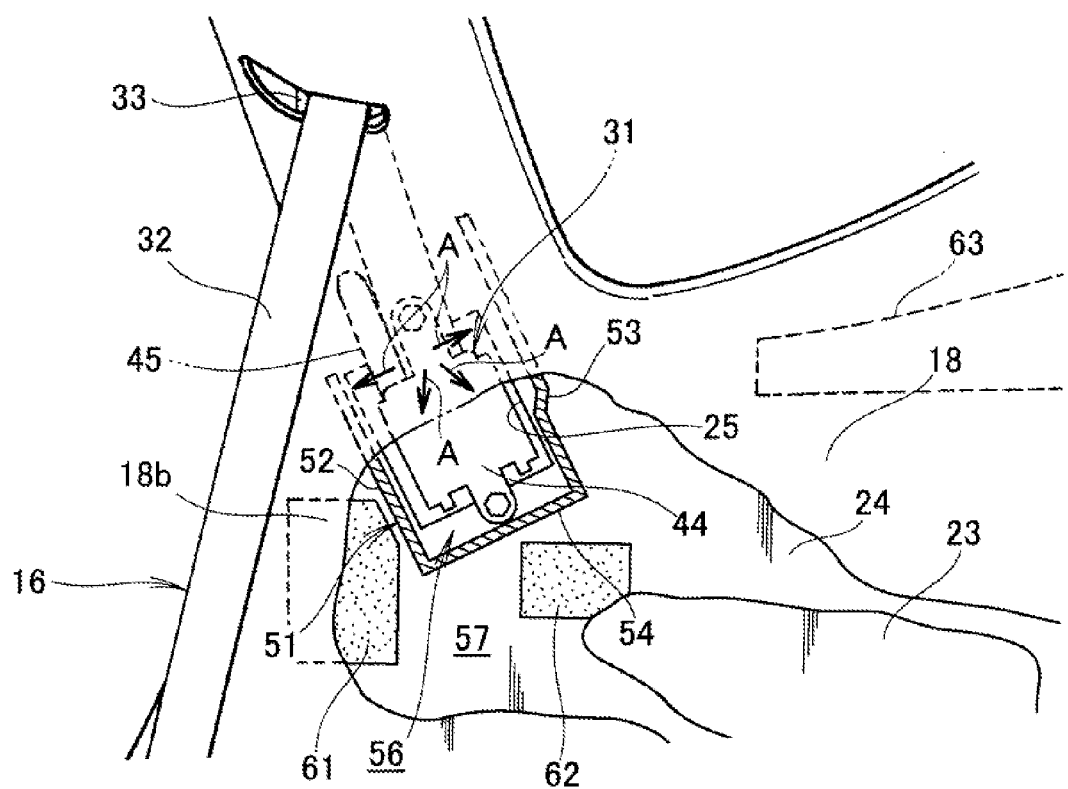
FIG. 5B is a view showing how an influence of the hot gas on soundproof members is minimized.

As also shown in FIG. 5B, when the hot gas leaks outside from the pretensioner 45 as indicated by arrows A, the leaked hot gas can be prevented from diffusing from the housing space 56 to the outside space 57. That is, the hot gas can be prevented from diffusing beyond the dividing wall 51 to the peripheral part 18b on the side opposite to the pretensioner 45 (i.e., peripheral part 18b of the dividing wall 51).

By preventing the diffusion of the hot gas in this manner, the first and second soundproof members 61, 62 and the other soundproof members (i.e., third to sixth soundproof members 63 to 66 (FIG. 2)) can be made free from the influence of the hot gas. The first and second soundproof members 61, 62 can therefore be installed in a region relatively near the pretensioner 45 (on the peripheral part 18b of the dividing wall 51, on the side opposite to the pretensioner 45).

Thus, the area for installing the first to sixth soundproof members 61 to 66, especially the first and second soundproof members 61, 62 can be increased. As a result, the first and second soundproof members 61, 62 can be arranged at more appropriate positions, thereby enhancing a degree of freedom in design and improving a soundproof effect.

Note that the vehicle structure equipped with the seatbelt device according to the present invention is not limited to the above-described embodiment, and various minor changes and modifications of the present invention are possible in light of the above teaching. For example, the embodiment has been explained in the case where the dividing wall 51 is integrally formed on the back surface 18a of the interior material 18, however, it is not so limited, and a dividing wall 51 as a separate member may be provided on the back surface 18a of the interior material 18. Further, although the dividing wall 51 is formed of resin in the embodiment, the dividing wall 51 may be made of metal.

Whereas in the embodiment the dividing wall 51 is formed on the back surface 18a of the interior material 18, it is not so limited, and the dividing wall 51 may be provided on the rear inner side panel 24.

Although in the embodiment the dividing wall 51 is formed by the front wall part 52, the rear wall part 53, and the bottom wall part 54, it is not, so limited, and the dividing wall 51 may be formed by the front wall part 52 and the rear wall part 53.

Whereas in the embodiment the retractor/pretensioner unit 31 has the pretensioner 45 arranged at the top part 44a of the retractor 44, it is not so limited, and the present invention may be applied to a retractor/pretensioner unit having a pretensioner 45 arranged at a bottom part or another part of a retractor 44.

If the present invention is applied to the retractor/pretensioner unit having the pretensioner 45 arranged at the bottom part the retractor 44, the pretensioner 45 can be enclosed more satisfactorily by the front wall part 52, the rear wall part 53, and the bottom wall part 54. As a result, diffusion of hot gas leaked from the pretensioner 45 can thereby be minimized more satisfactorily.

Although in the embodiment the retractor/pretensioner unit 31 in which the pretensioner 45 is integrated with the retractor 44 is used, it is not so limited, and the present invention may be applied to a pretensioner 45 provided separately from a retractor 44.

Whereas in the embodiment the first to sixth soundproof members 61 to 66 are installed on the back surface 18a of the interior material 18, it is not so limited, and the first to sixth soundproof members 61 to 66 may be installed on the rear inner side panel 24.

Although in the embodiment the seatbelt device 16 is mounted on the rear seat side in the vehicle body, it is not so limited, and the present invention may be applied to a seatbelt device mounted at another part in the vehicle body.

Whereas in the embodiment the soundproof unit 21 is installed on the back surface 18a of the interior material 18, it is not so limited, and the soundproof unit 21 may be installed on the rear inner side panel 24.

Furthermore, the shapes and configurations of the vehicle structure 10 equipped with the seatbelt device, the vehicle body 11, the seatbelt device 16, the interior material 18, the rear inner side panel 24, the pretensioner 45, the dividing wall 51, the first and second soundproof members 61, 62, etc. are not limited to those illustratively shown and described herein, and they may be modified as necessary.

INDUSTRIAL APPLICABILITY

The vehicle structure of the present invention is well suited for use in passenger vehicles equipped with a seatbelt device including a pretensioner for retracting a webbing to properly restrain a passenger.

REFERENCE CHARACTERS

10 . . . vehicle structure equipped with a seatbelt device, 11 . . . vehicle body; 16 . . . seatbelt device, 18 . . . interior material, 18b . . . peripheral part, 24 . . . rear inner side panel (panel), 26 . . . vehicle interior, 32 . . . webbing, 45 . . . pretensioner, 51 . . . dividing wall, 61 . . . first soundproof member (soundproof member), 62 . . . second soundproof member (soundproof member), L . . . gap

The invention claimed is:

1. A vehicle structure equipped with a seatbelt device, wherein a pretensioner for retracting a webbing to restrain a passenger is provided on a panel of a vehicle body, and an interior material covering the pretensioner is provided on a side facing a vehicle interior, characterized in that:
   one of the interior material and the panel has a dividing wall formed thereon to enclose the pretensioner and partition a gap between the panel and the interior material.

2. The vehicle structure equipped with the seatbelt device of claim 1, wherein the interior material and the dividing wall are formed of resin, and the dividing wall is formed on the interior material.

3. The vehicle structure equipped with the seatbelt device of claim 1, wherein the dividing wall is formed to be opened upward.

4. The vehicle structure equipped with the seatbelt device of claim 1, which further includes soundproof members provided on a peripheral part of the dividing wall on a side opposite to the pretensioner with respect to the dividing wall.

5. The vehicle structure equipped with the seatbelt device of claim 2, wherein the dividing wall is formed to be opened upward.

6. The vehicle structure equipped with the seatbelt device of claim 2, which further includes soundproof members provided on a peripheral part of the dividing wall on a side opposite to the pretensioner with respect to the dividing wall.

7. The vehicle structure equipped with the seatbelt device of claim 3, which further includes soundproof members provided on a peripheral part of the dividing wall on a side opposite to the pretensioner with respect to the dividing wall.

* * * * *